Patented Nov. 17, 1931

1,831,852

UNITED STATES PATENT OFFICE

PEDER FARUP, OF VETTAKOLLEN, VESTRE AKER, NORWAY, ASSIGNOR TO TITANIUM PIGMENT COMPANY INC., OF NEW YORK, N. Y., A CORPORATION OF MAINE

TREATING TITANIUM COMPOUNDS CONTAINING IRON

No Drawing. Application filed May 24, 1927, Serial No. 193,951, and in Norway August 3, 1926.

For a technical-economical utilization of titanium materials containing iron it is of great importance that the separation of iron and titanium may as far as possible take place in such a way that the material's content of titanium as well as of iron may be recovered in a form to be easily utilized.

In the processes now generally used the titanium materials containing iron are subjected to a treatment with sulphuric acid, whereby both titanium and iron are transferred to sulphate solutions from which titanic acid is separated out by boiling, while iron sulphate remains in the solution together with other soluble compounds and free sulphuric acid. This process thus necessitates a simultaneous dissolution of iron as well as of titanium, and thereby makes an economical utilization of the iron content of these materials difficult. Considerable quantities of sulphuric acid are necessary for dissolving the iron compounds and there results solutions rich in iron from which titanic acid is to be precipitated.

According to my present invention these difficulties are avoided as it has been found possible to transfer the iron to metallic state by a preliminary reducing treatment of the titanium material containing iron. The reduced materials are then treated with sulphuric acid in a suitable way, whereby the titanium content is dissolved or becomes easily water soluble while the metallic iron remains undissolved and may be separated out by a mechanical or magnetic separation process.

I have carried out reductions of titanium materials containing iron in a series of different ways and discovered the effect of acids on the reduced titanium materials under varying conditions. I have also investigated the behavoir of metallic iron with relation to titanium solutions of varying composition, specific gravity, temperature, etc., also in presence of free acids or added substances.

In the several steps of my process, the titanium material used is mixed with a carbonaceous reducing agent and then heated in a reducing atmosphere without admission of air in the usual electric furnace to red heat for some hours. The reduction product is then, some times, after crushing, given an addition of sulphuric acid and treated therewith under heating until the desired degree of dissolution is obtained. In the resulting mass the iron is principally present in the form of undissolved, finely divided metallic iron, while the greater part of the titanium is present in dissolved or easily soluble state. If, however, this reaction mass is diluted, for instance with water, over a certain limit it will be found that a lively evolution of hydrogen will begin, and that the solution gradually acquires bluish violet color as the metallic iron is partly dissolved during the evolution of hydrogen and a reduction of the tetravalent titanium compounds to trivalent takes place. As dilution in most cases is necessary to obtain a suitable titanium solution for further treatment, the addition of water or acids must not take place above said limit before the metallic iron has been removed. The separation of the iron is then effected in known ways by magnetic separation. The iron powder separated out may be removed by brushing or also by washing. To avoid attack and oxidation of the iron during or after the separation, there may be added substances as for instance bases or flotation agents. When the metallic iron has been removed in this way, it is subjected to the necessary treatment as for instance washing, drying, pressing, etc. to be transformed to a directly marketable iron or for further use in other processes or industries.

For further illustration of how my invention may be carried out, the following specific examples are given:

(A) An ilmenite containing about 41% $TiO_2$ and 35% Fe besides gangue and with a grain size of about 1 millimeter is mixed with about 10% coke or charcoal powder as a reducing agent and then heated in an electric muffle furnace for 6 to 10 hours at a temperature of about 1000° C. until the iron is reduced to the metallic state. Upon cooling the charge without excessive exposure to atmosphere, the reduced material after milling if necessary is mixed under stirring with an equivalent amount of sulphuric acid of 75% strength, (100 kg. sulphuric acid to 100 kg. ilmenite), and heated to a temperature of about 130–150° C. for several hours. As the boiling point of the solution obtained is lowered during the dissolution process, it is advisable to maintain a higher temperature at the beginning of the process than at the end. After 3 to 6 hours the dissolution process is interrupted and the mass has then acquired a very thick consistency. In case the consistency is too thick for stirring during the dissolution process, the mass is sufficiently diluted with water or solutions of salts or thin acid recovered from the process. The dilution must, however, not be carried so far that dissolution of the metallic iron takes place. When the dissolution process is finished, the mixture is further diluted until it is sufficiently fluid to be treated in a magnetic separator. A dilution to a volume 150% of the original will generally be suitable. The solution is now passed through a magnetic separator whereby the metallic iron formed during the reduction process is removed from the solution which is rich in titanium and poor in iron. The iron is washed and utilized in any known way. The titanic solution is further diluted to about 120 grams $TiO_2$ per liter and freed from undissolved solids. It is then treated in known ways for production of titanium pigments or other compounds.

Some times I prefer to add about 10% soda to the ilmenite before the reduction in the electric furnace to aid in more readily breaking down the ilmenite.

(B) The ilmenite of Example (A) is reduced as described in this example. The reduced charge is then mixed with sulphuric acid of 80% strength and heated to 150°–200° C. until a dry or semi-dry mass is obtained. This mass is diluted with water until it becomes sufficiently fluid to be treated in a magnetic separator, that is generally to a content of 175 grams $TiO_2$ per liter. The temperature is kept below 30° C. during the dissolution process, and the dilution must, however, not be carried so far that dissolution of the metallic iron takes place.

After the dissolution process has been finished I proceed as hereinafter set forth in Example (A).

After the iron has been removed from the solution as hereinbefore described, the solution may be diluted with water or more dilute solutions of acids or salts. This dissolution and solution process may also be carried out in known ways, for example, by employing the methods described in my U. S. Letters Patent No. 1,773,727, dated August 26, 1930.

The above examples only relate to preferred modes of procedure, and it will easily be understood that the principle herein described may to a great extent be modified and carried out in other ways. This is true as well with regard to the reduction process employed as the subsequent dissolution and separation process with necessary subsequent treatments. For the reduction process finer as well as coarser materials or products may for instance be employed and any solid, liquid or gaseous reducing agents may be used.

To get a product which is adapted for the further treatment additions of magnesium—alkali—and alkaline earth compounds may be made during the reduction process, which compounds assist in more readily breaking down the ilmenite.

The primary object of the reduction process is the reduction of the oxidic iron compounds to metallic iron. At the same time more or less reduction of the titanium compounds of the material may take place, depending on the method of operation chosen. In the latter case it may then be advantageous to carry out the dissolution process in the presence of an oxidizing agent or for instance under introduction of air.

The reduction process may also be effected in known ways in the presence of nitrogen and corresponding greater amounts of reduction material whereby the titanium content of the material is wholly or partly transformed to nitrogen compounds. During the subsequent dissolution process, which may also be carried out at a pressure higher than 1 atmosphere and at corresponding temperature, the nitrogen will be transformed to ammonium sulphate which may be further utilized in known ways.

The strength of the acid employed may vary within rather wide limits. If a concentrated acid is employed, a more or less solid mass is obtained, the further dissolution and treatment of which are effected as before described. Preferably more dilute acid, as for instance Glover-acid, is used. The strength of the acid must not be so low that a noticeable dissolution of the metallic iron will take place. The limit for this acid concentration will be determined by the character of the material and the working temperature chosen. Generally an acid concentration between chamber- and Glover-acid will be the most suitable.

The titanium solution is if necessary freed from suspended slime and further treated in known ways for recovery of titanium compounds.

I claim as my invention:

1. The process of treating titanium materials containing iron which consists in subjecting said materials and a reducing agent to a temperature sufficiently high to reduce the iron to metallic state but not the titanium compounds, and treating the reduction product with sulphuric acid sufficiently concentrated to dissolve the titanium compounds present without dissolving the metallic iron.

2. The process of treating titanium materials containing iron which consists in subjecting said materials and a reducing agent to a temperature sufficiently high to reduce the iron to metallic state but not the titanium compounds, treating the reduction product with sulphuric acid sufficiently concentrated to dissolve the titanium compounds present without dissolving the metallic iron, and thereafter separating the metallic iron from the titanic solution.

3. The process of treating titanium materials containing iron which consists in subjecting said materials and a reducing agent mixed with an alkali compound to a temperature sufficiently high to reduce the iron to metallic state but not the titanium compounds, and treating the reduction product with sulphuric acid sufficiently concentrated to dissolve the titanium contents present without dissolving the metallic iron.

4. The process of treating titanium materials containing iron which consists in subjecting said materials and a reducing agent mixed with an alkali compound to a temperature sufficiently high to reduce the iron to metallic state but not the titanium compounds, treating the reduction product with sulphuric acid sufficiently concentrated to dissolve the titanium content present without dissolving the metallic iron, and thereafter separating the iron from the titanic solution.

5. The process of treating titanium materials containing iron which consists in subjecting said materials and carbon in comminuted form in a reducing atmosphere to a temperature sufficiently high to reduce the iron compounds to metallic iron, but not the titanium compounds, and heating the reduction product mixed with sulphuric acid sufficiently concentrated to dissolve titanium compounds present without dissolving the metallic iron.

6. The process of treating titanium materials containing iron which consists in subjecting said materials and carbon in comminuted form in a reducing atmosphere to a temperature sufficiently high to reduce the iron compounds to metallic iron, but not the titanium compounds, cooling the mass in a non-oxidizing atmosphere, and heating the reduction product mixed with sulphuric acid sufficiently concentrated to dissolve titanium compounds present without dissolving the metallic iron.

7. The process of treating titanium materials containing iron which consists in subjecing said materials and a reducing agent to a temperature sufficiently high to reduce the iron to metallic state but not the titanium compounds, heating the reduction product at a pressure higher than one atmosphere mixed with sulphuric acid sufficiently concentrated to dissolve the titanium compounds present without dissolving the metallic iron, and separating said metallic iron from the solution.

8. The process of treating titanium materials containing iron which consists in subjecting said materials and a reducing agent to a temperature sufficiently high to reduce the iron to metallic state but not the titanium compounds, heating the reduction product in the presence of air mixed with sulphuric acid sufficiently concentrated to dissolve the titanium compounds without dissolving the metallic iron, and separating said metallic iron from the solution.

9. The process of treating titanium materials containing iron which consists in subjecting said materials and a reducing agent to a temperature sufficiently high to reduce the iron to metallic state but not the titanium compounds, heating the reduction product mixed with sulphuric acid sufficiently concentrated to dissolve the titanium compounds present without dissolving the metallic iron, separating said metallic iron from the solution, and treating the solution to precipitate therefrom titanium compounds.

PEDER FARUP.